(No Model.)

M. CHASE.
TIRE TIGHTENER.

No. 320,850. Patented June 23, 1885.

Witnesses.
H. Blantro
H. E. Ware

Inventor.
Milton Chase
by J. H. Adams
Attorney.

UNITED STATES PATENT OFFICE.

MILTON CHASE, OF HAVERHILL, MASSACHUSETTS.

TIRE-TIGHTENER.

SPECIFICATION forming part of Letters Patent No. 320,850, dated June 23, 1885.

Application filed April 10, 1885. (No model.)

*To all whom it may concern:*

Be it known that I, MILTON CHASE, a citizen of the United States, residing at Haverhill, in the county of Essex and State of Massachusetts, have invented certain new and useful Improvements in Tires and the Means of Applying Tires to Vehicle-Wheels, of which the following is a specification.

The object of my invention is to construct a vehicle-wheel tire so that it can be readily secured to the fellies of the wheel, and at the same time provide means for securing the tire at its ends and to the fellies without the use of bolts.

The invention consists in making the tire, which has two disconnected ends, of a length less than the circumference of the wheel, and with a dovetail projection at each end, the two ends of the tire being held in position on the wheel by means of a key or plate formed to correspond with and fill up the space between the ends of the tire.

The invention further consists in a device for drawing the ends of the tire into position on the fellies and holding them until the proper sized key or plate has been inserted.

Figure 1:
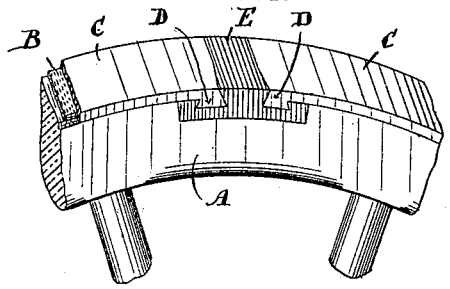
Figure 2:
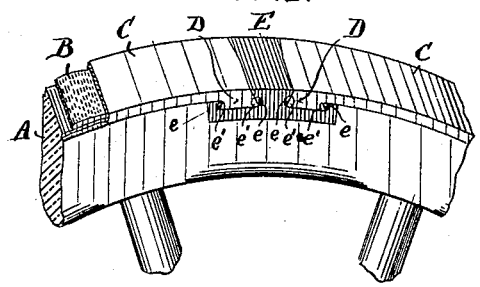
Figure 3:
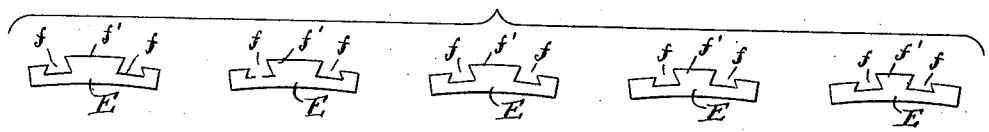
Figure 4:
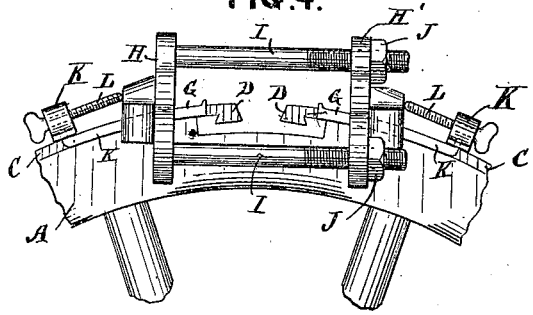
Figure 5:
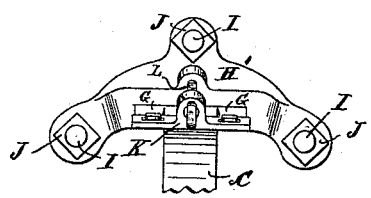

Referring to the accompanying drawings, Figure 1 represents one side of a portion of a wheel, showing the ends of the tire and the key or plate. Fig. 2 is a view of the opposite side of the same. Fig. 3 shows keys or plates of various sizes. Fig. 4 represents a portion of a wheel with the tire drawn into position by the tire-setter before the insertion of the key or plate. Fig. 5 is an end view, and Fig. 6 a plan or top view, of the same. Fig. 7 is a section taken on the line $x\ x$ of Fig. 6.

A represents the fellies of a wheel, around which is placed an elastic packing, B.

C is the tire formed on its edges with flanges which cover the edges of the fellies of the wheel and serve to hold in position the packing B. The tire is of a length somewhat shorter than the circumference of the wheel, and has at each end on its under side a dovetailed projection, D, which fits in corresponding dovetailed recesses $f\ f$ in a key or plate E, as shown. The central portion, $f'$, of the key E is made to be flush with the circumference of the tire, and is of a slightly tapering form across its length, so as to act as a wedge when connecting with the two corresponding ends of the tire, as indicated in Figs. 1 and 2. Small projections $e$ are formed in the ends of the keys at one side, which are made to fit in corresponding recesses, $e'$, in the dovetailed ends of the tire, as shown in Fig. 2, so that when the key E has been driven into place the projections $e$ can be riveted over into the recesses $e'$, and thus hold the key and ends of the tire firmly together, and by this means dispensing with bolts or other fastenings requiring the drilling of holes, and so weakening the tire. The keys or plates E are all of the same length to fit in the groove cut in the fellies; but the width of the central projection, $f'$, is varied, as shown in the several illustrations in Fig. 3, so as to accommodate varying lengths of tire caused by shrinkage or expansion of the fellies or packing, or from other causes.

To place the tire upon the wheel, or to tighten the tire should it become loose, I employ four clamping-jaws, G, carried in frames H H'. The jaws G are provided with teeth on their inner edges, which are caused to grip the edges of the tire. The frames H H' are connected together by means of bolts and nuts I J, so that they can be drawn toward each other by turning the nut J. The outer ends of the jaws G are turned upward and pass through slots in yokes K placed over them.

Each yoke K is provided at the center with a screw-threaded boss, through which passes a thumb-screw, L, the ends of which bear against the frames H H'.

Figure 6:
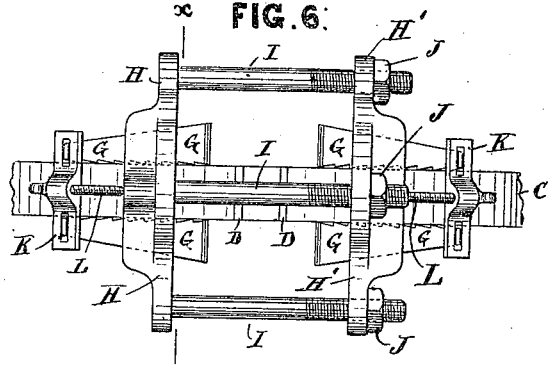
Figure 7:
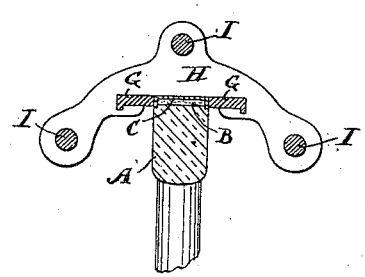

The outer sides of the jaws G G are made tapering, as shown in Fig. 6, and they pass through slots in the frames H H'. When the thumb-screws L are turned to force the yokes away from the frames H H', the faces or teeth of the jaws G will be drawn into close contact with the rims of the tire, and the nuts J, being then turned on the bolts I, the frames H H' will be drawn toward each other, carrying with them the ends of the tire, until the latter is tightly and evenly drawn around the fellies, when a key, E, of the proper size is driven in between the ends of the tire and riveted over, thereby securely holding the tire in position.

Among the advantages of my invention are the following: A great saving of time and expense is effected in applying and resetting the tire. Again, bolts are dispensed with and holes in the tire and fellies are not required, thereby rendering them stronger. A perfect fitting of the tire is also effected, and consequently all rattling is avoided, and the fellies are completely protected.

I am aware that tires having a turned-down flange at each side are not new; and, also, that an elastic material has been used on a carriage-wheel. These I do not claim; but

What I claim as my invention is—

1. A tire made shorter in length than the circumference of the wheel on which it is fitted, and provided at each end with a dovetailed projection, in combination with a key or plate provided with corresponding recesses and projections, substantially as and for the purpose set forth.

2. A key or plate, E, provided with projections $e$ on one side, in combination with the dovetailed ends of the tire provided with the recesses $e'$, whereby the ends of the tire and the plate are firmly riveted together, as described.

3. The key or plate E, constructed with the dovetailed grooves $f\,f$ and a central dovetailed projection, $f''$, in combination with the tire C, as and for the purpose set forth.

4. A tire-setter consisting of the jaws G', the frames H H', bolts I, and nuts J, in combination with the tire C, substantially as described.

In testimony whereof I have signed my name to this specification in the presence of two subscribing witnesses.

MILTON CHASE.

Witnesses:
  J. H. ADAMS,
  E. PLANTA.